Patented Nov. 30, 1943

2,335,615

UNITED STATES PATENT OFFICE 2,335,615

SOLDER FOR SOLDERING FOILS OF ALUMINUM AND ALUMINUM ALLOYS

Fred Strasser, Basel, Switzerland, assignor to Alexandre Clavel, Basel, Switzerland No Drawing. Application August 11, 1942, Serial No. 454,404. In Switzerland May 6, 1942

1 Claim. (Cl. 75—134)

The present invention relates to a solder for soldering foils of aluminum and aluminum alloys.

A process for using the solder of the invention consists in that foils of aluminum and aluminum alloys to be soldered are placed upon a heated base whereon the foils are soldered with one another by applying a solder comprising bismuth, lead, tin, cadmium and silver.

The object of the invention is the provision of a solder having the following quantitative constitution in parts by weight: bismuth 500 to 550 parts, lead 60 to 120 parts, tin 180 to 200 parts, cadmium 80 parts and silver 50 parts.

The production process of the solder can be performed, for instance, in the following manner: At first the silver is melted and afterwards are added cadmium, lead, bismuth and at last tin.

The melting is suitably performed in crucibles, for instance graphite crucibles, and the molten alloy is afterwards poured into metal moulds.

Upon a base heated up to 90 degrees Celsius aluminum foils and foils of aluminum alloys down to a thinness of about $3/10000$ inch can be soldered by applying the above described solder.

What I claim is:

Solder to be used for soldering foils of aluminum and aluminum alloys with one another, having the following quantitative constitution in parts by weight: bismuth 500 to 550 parts, lead 60 to 120 parts, tin 180 to 200 parts, cadmium 80 parts and silver 50 parts.

FRED STRASSER.